June 19, 1945.    P. L. LOEWE ET AL    2,378,488
LAWN MOWER
Filed April 8, 1944    5 Sheets-Sheet 1

Inventors
Peter L. Loewe
Eugene L. Boyce
by Parker & Carter
Attorneys.

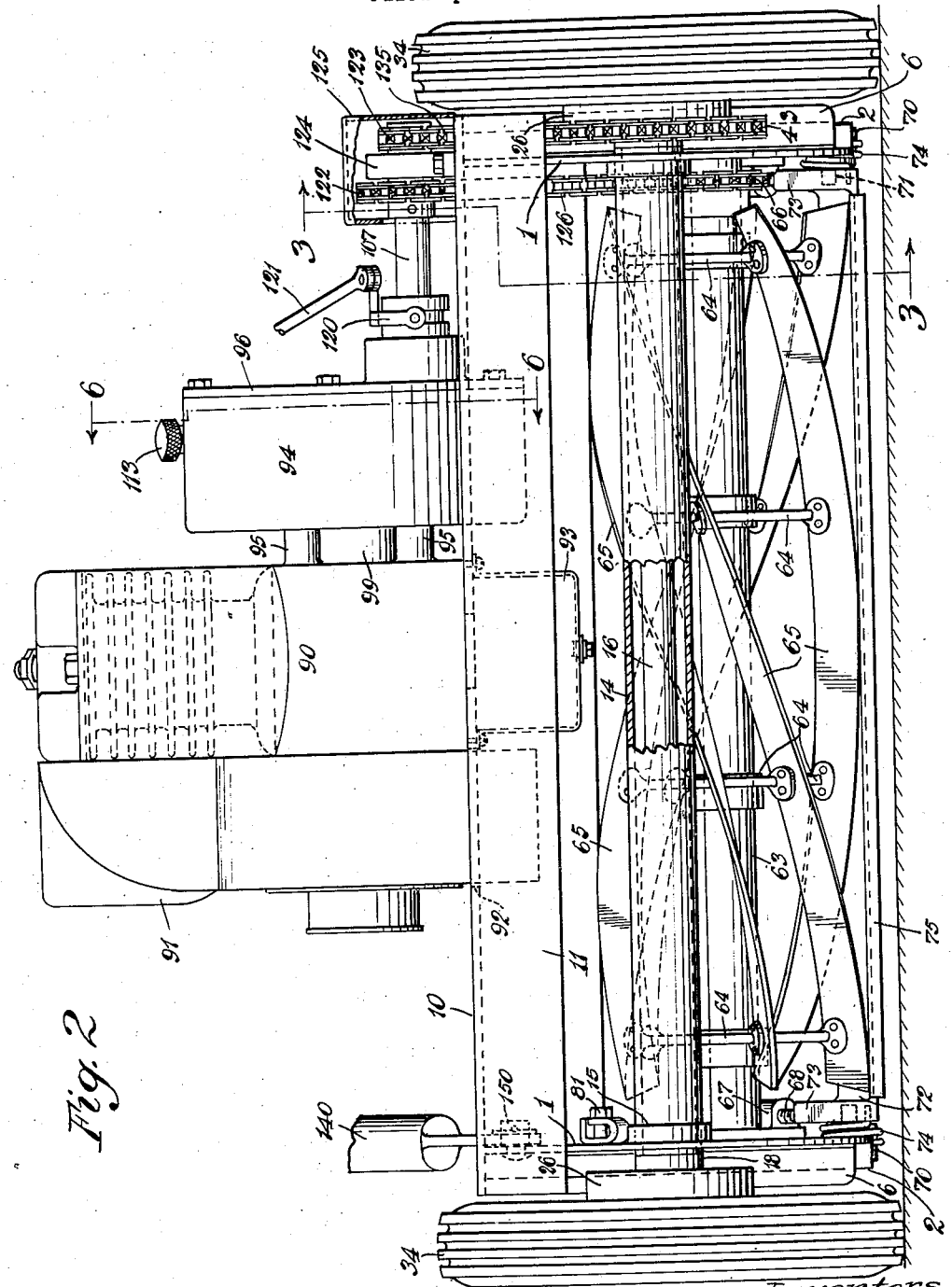

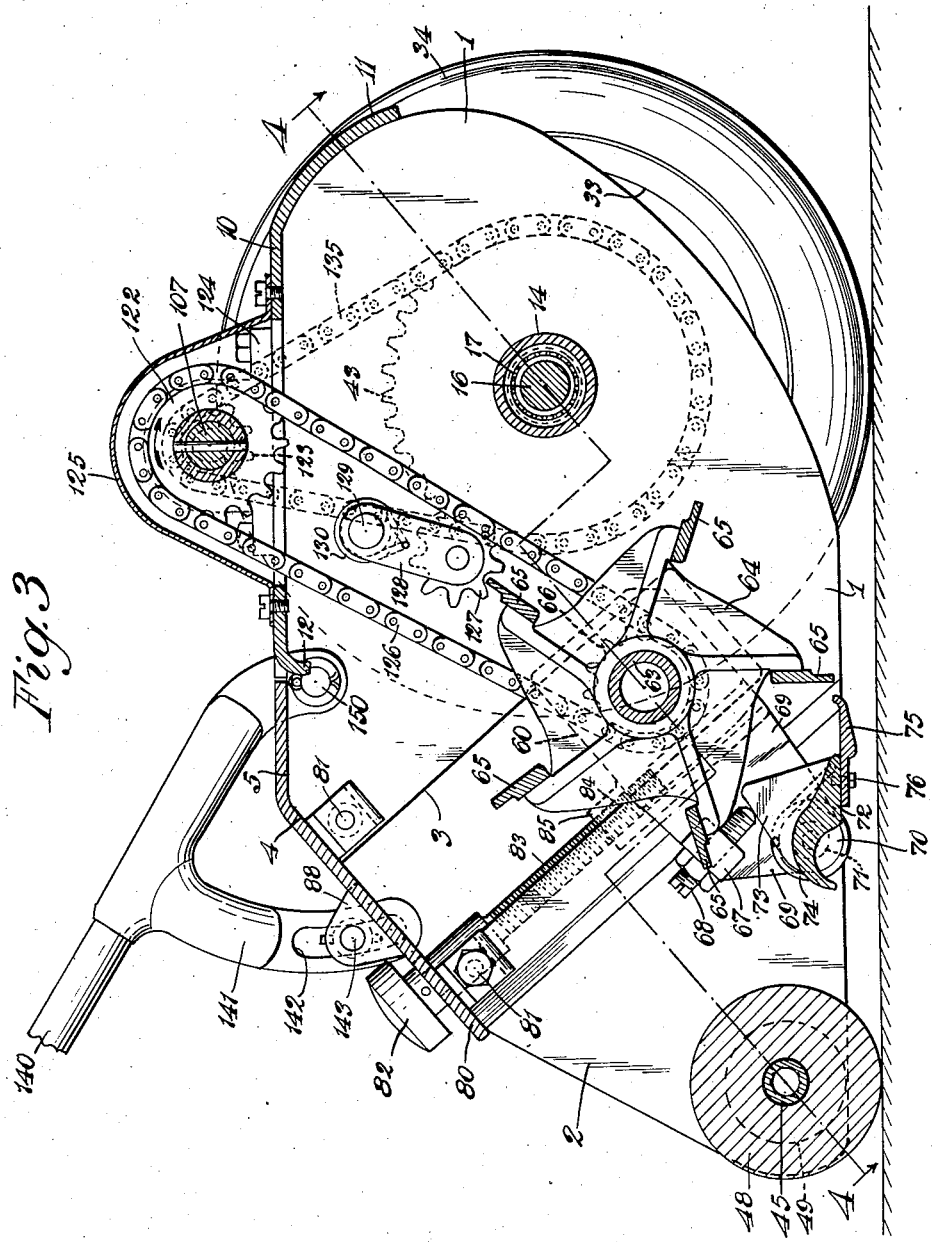

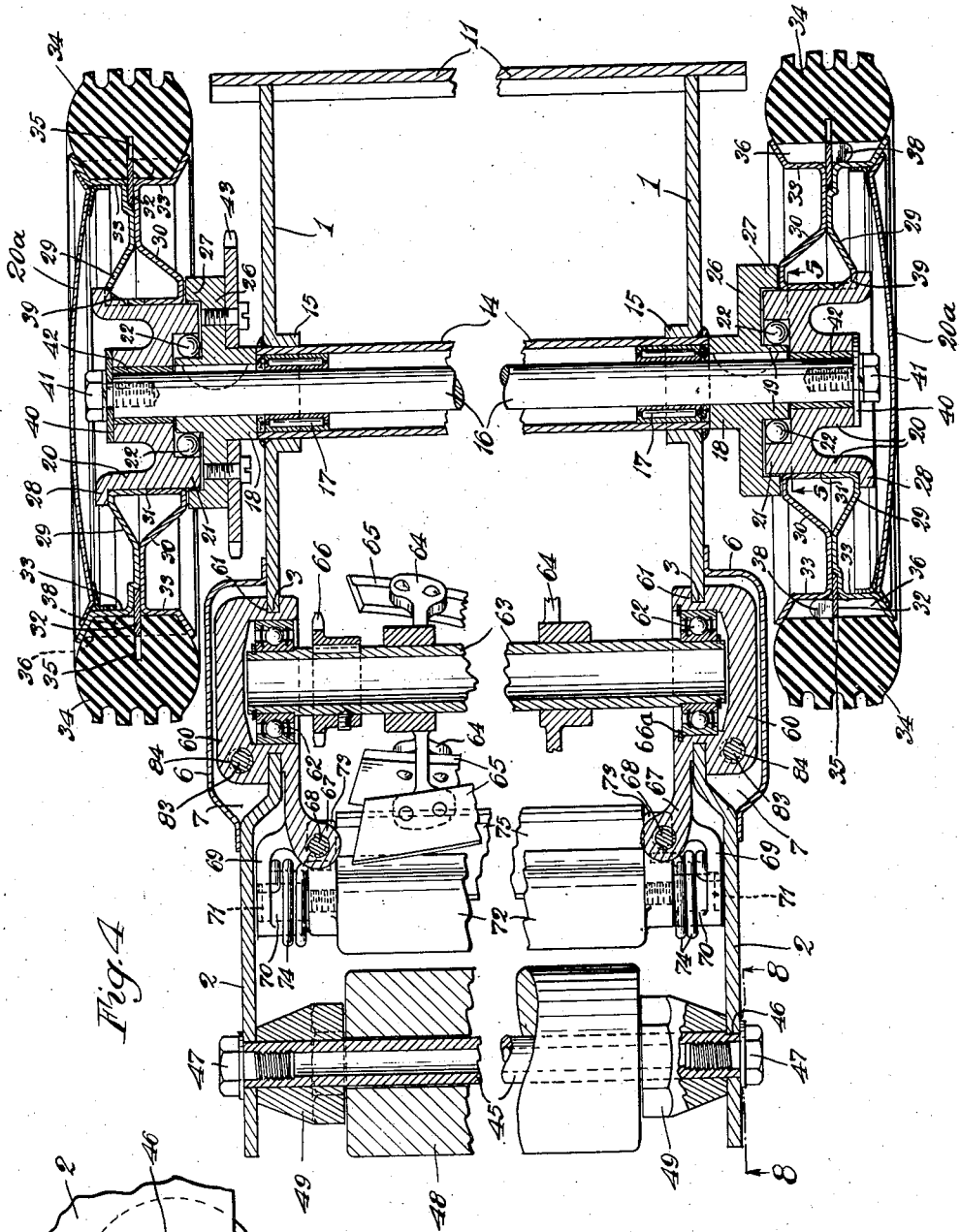

June 19, 1945.  P. L. LOEWE ET AL  2,378,488

LAWN MOWER

Filed April 8, 1944   5 Sheets-Sheet 5

Inventors
Peter L. Loewe
Eugene L. Boyce
by Parker Carter
Attorneys

Patented June 19, 1945

2,378,488

UNITED STATES PATENT OFFICE 2,378,488

LAWN MOWER

Peter L. Loewe and Eugene L. Boyce, Chicago, Ill., assignors to H. Goldberg, Chicago, Ill.

Application April 8, 1944, Serial No. 530,102

14 Claims. (Cl. 56—26)

Our invention relates to an improvement in lawn mowers and driving means therefor.

One purpose is to provide an improved lawn mower chassis.

Another purpose is to provide an improved cutting unit or assembly for lawn mowers, including a rotary cutter and cutter bar.

Another purpose is to provide a lawn mower in which the cutter assembly is unitarily and readily removable from the lawn mower chassis.

Another purpose is to provide improved driving means for a motor operated lawn mower.

Another purpose is to provide a motor driven lawn mower having a low vertical clearance.

Another purpose is to provide an improved wheel assembly for lawn mowers.

Another purpose is to provide an improved ratchet connection for lawn mower wheels.

Another purpose is to provide an improved lawn mower wheel and tire and means for preventing tilting of the tire.

Another purpose is to provide improved handle means for a motor driven lawn mower.

Another purpose is to provide an improved motor and drive assembly and support for lawn mowers.

Other purposes will appear from time to time throughout the course of the specification and claims.

Our invention is illustrated more or less diagrammatically in the accompanying drawings, wherein—

Figure 2 is a front elevation with parts broken away;

Figure 3 is a section on the line 3—3 of Figure 2 on an enlarged scale;

Figure 4 is a section on the line 4—4 of Figure 3;

Figure 8 is a section on the line 8—8 of Figure 4.

Like parts are indicated by like characters throughout the specification and drawings.

Figure 1:
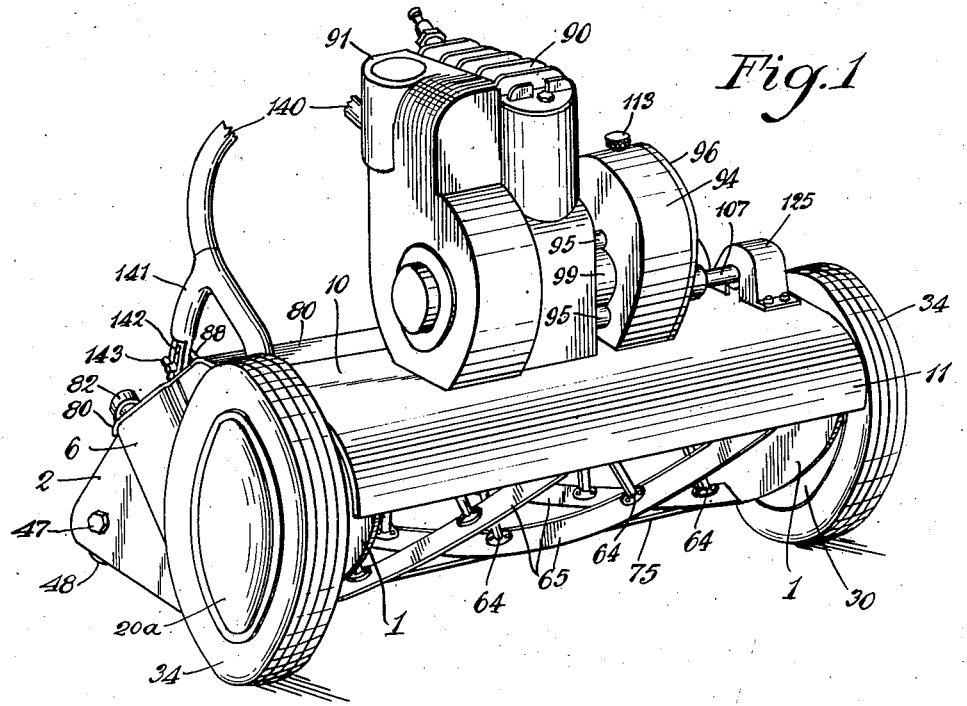
Figure 1 is a perspective view.

Referring to the drawings, the chassis structure includes a pair of side plates 1. Each said side plate has a rearwardly outwardly flared part 2. Each side plate is provided with a wide slot or cut-away portion 3, having parallel walls, the walls or edges being upwardly and rearwardly inclined toward an inclined edge portion 4 which is inclined downwardly from the forward upper edge portion 5.

The slotted portion of each plate may be outwardly masked by any suitable sub-plate or outward projection 6, the opposite edges of which are secured to the outer face of the plate as shown for example in Figure 4. It will be observed that these outer plates 6 define with the adjacent masked portions of the plates 1, a pocket or space 7 which is open at the top.

The upper edges of the plates 1 are connected by a top plate 10, the forward edge of which is curved downwardly as at 11 to conform to the engaging portions of the front edges of the plates 1, as shown in Figure 3. This downwardly curved portion 11 of the plate 10 serves as a bumper or guard for the later described structure within the chassis. Note that the rearward edge of the plate 10 may be downwardly somewhat curved as at 12. The plates 1 are further connected by a tubular sleeve or strut 14, which is welded or otherwise secured to integral offset sleeves 15 extending inwardly from the plates 1. Rotatably mounted within the strut 14 is the wheel shaft or axle 16 which is shown as rotatable in any suitable bearings such as needle bearings 17.

Figure 5:
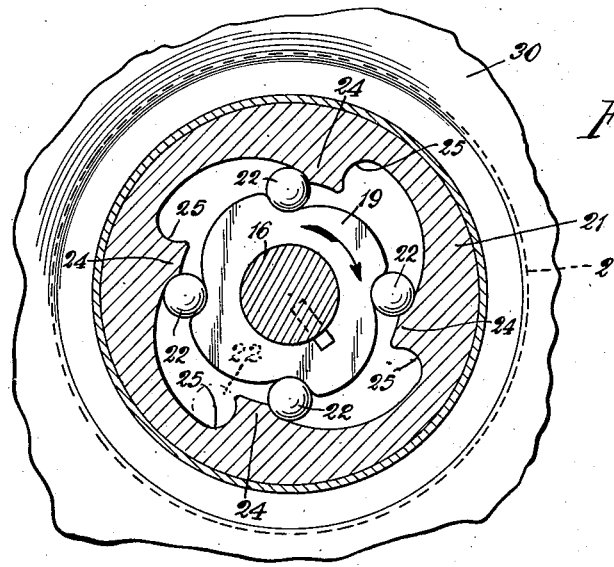
Figure 5 is a section on an enlarged scale on the line 5—5 of Figure 4.
Figure 7:
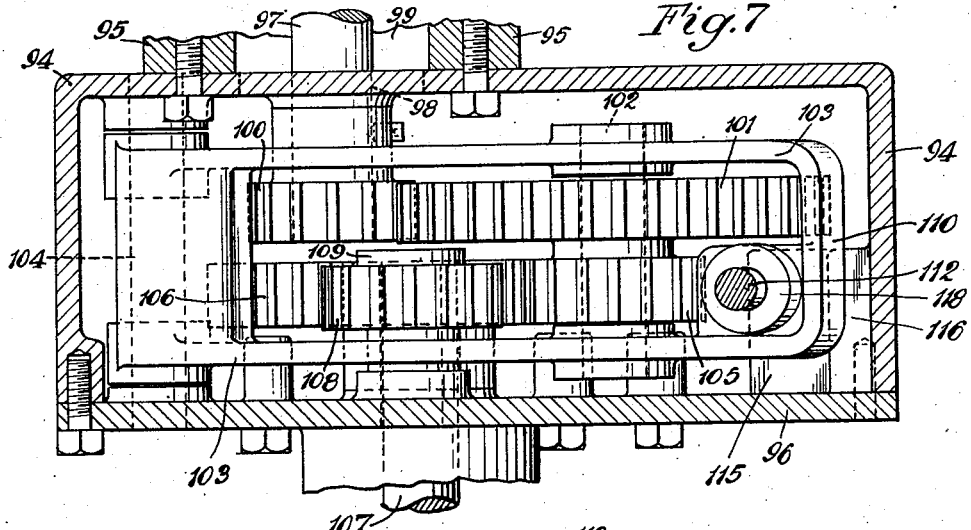
Figure 7 is a section on the line 7—7 of Figure 6.

Keyed to each end of the shaft 16 is a hub 18, one part of which as at 19, is formed to act as the inner ratchet member. The portion 19 is surrounded by an outer ratchet member 21 which forms part of the wheel hub 20, which is rotatable about the shaft 16, so far as is permitted by the opposed ratchet members and the balls 22. It will be noted from Figure 5 that when the parts are in the position in which they are shown at that figure and the shaft 16 and hub shaft are rotated in a clockwise direction, the balls 22 are in driving relationship with projections 24 of the outer ratchet member 21. A reversal of the direction of rotation of the shaft 16 will move the balls into the pockets 25 and permit relative rotation of the inner and outer ratchet members. The shaft hub 18 has a radially outwardly extending web 26 which terminates in a longitudinally outwardly extending flange 27 which partially surrounds the outer ratchet member 21. The wheel hub 20 has an outer flange 28. Surrounding the wheel hub and abutting against said flange 28 is a wheel web structure including separate web members 29 and 30 which are inwardly flared apart as shown in Figure 4 and have portions conforming to the exterior of the hub 20 with edges which abut as at 31. The outer portions of the webs 29 and 30 abut and are secured together in any suitable manner for example by welding. They are spaced apart to receive a tire engaging ring or sequence of members 32. They also have outwardly flared portions 33 which combine to form a tire trough adapted to receive the tire 34. This tire has a circumferentially extending slot 35 and a series of cross slots 36. Preferably the parts 33 extend upwardly about the sides of the tire 34 far enough to mask the ends of the transverse slots 36. The member or members 32 extend into the slot 35 and are provided with any suitable lateral projections or flanges 38 which extend into the cross slot 36. The web structure may be held against rotation in relation to the wheel hub 20 by any suitable interpenetration as at 39.

40 is any suitable end plate on the shaft 16 held by any suitable screw 41 to prevent outward displacement of the wheel structure. 42 is any suitable bushing or bearing about the shaft 16 for the wheel hub 20. One of the hub structures 18 and its web 26 may have secured thereto any suitable sprocket 43, whereby the wheel assembly may be driven from the drive structure which will later be described.

The rear ends or corners of the side plates 1 are further connected by a tubular member which, when in position, serves as an additional strut or support. We illustrate for example the tube 45, one end of which may be flattened as at 46 to prevent rotation of the tube when inserted into the side plate portions 2. The screws 47 in that event are effective to hold the side plates against such shoulders, and the tube can therefore act as a stiffening member and contribute to the strength and general rigidity of the chassis as a whole. 48 indicates a roller or rollers, it being understood that several rollers may be employed with any suitable spacers or washers thereupon. 49 are end spacers for spacing or centering the rollers or roller at the proper point between the side plate portions 2.

The cutter assembly is a unit which may be unitarily inserted in or removed from or adjustable in relation to the above described chassis. The assembly includes for example a pair of end members generally indicated at 60 which are slotted as at 61, to surround and slide in relation to the opposed edges of the slots 3 of the side plates. Mounted in the inner side of each of the cutter assembly end members 60 is any suitable bearing structure, for example a sealed ball bearing assembly 62 in which rotates the shaft 63 which carries any suitable spiders or arms 64 to which are secured the cutter blades 65. The shaft 63 also carries a sprocket 66. We find it advantageous to anchor one of the bearing assemblies 62 in relation to one of the side members 60 thereby permitting the other assembly freedom of longitudinal movement in relation to the opposite side member 60. Such anchoring or securing means are indicated as at 66a in Figure 4.

Extending rearwardly from an inner portion of each of the side members 60 is a lug 67 adapted to receive any suitable adjusting screw and nut assembly 68. 69 is a web which may be unitary with the end member 60 and the lug 67 and which extends downwardly and is provided with an inwardly extending boss 70 apertured to receive a pin 71 of the cutter bar structure 72. The cutter bar structure has ears 73 which are normally upwardly urged against the ends of the adjusting screws 68 by any suitable means such as the coil spring 74, one end of which is anchored on the cutter bar and the other to the web 69. Thus the ear 73 will be yieldingly urged against the adjusting screws 68. The cutter bar proper 75 may be secured to the above-mentioned structure as at 76.

The above described structure can be slid as a unit into and out of the slots 3. It may also be readily adjusted toward and away from the surface on which the lawn mower is operating. We employ for example a top plate 80 which spans the upper edges of the side plates 1 and may be removably secured thereto in any suitable manner for example by bolts 81. Extending through said plate 80 at each end thereof is a manually adjusting and releasing element 82 having a screw threaded portion 83 which enters correspondingly screw threaded apertures in the end members 60 as at 84, in the bosses 85. Thus by rotating the members 82, the entire above described cutting assembly can be moved along the slots 3. If it is desire to remove the entire assembly, the securing bolts 81 are released and the entire structure is drawn upwardly out of the slots. We also illustrate securing lugs 88, the purpose of which will later appear.

Mounted on and supported on the transverse top plate 10 is any suitable motor structure generally indicated at 90, the details of which do not of themselves form part of the present invention. Any suitable fuel storage tank 91 may be employed and if necessary, the plate 10 may be recessed or apertured as at 92 to receive the lower portion thereof. 93 is an oil tank or pan for the motor which is shown as secured to the lower face of the top plate 10. It will be understood that if desired, the oil tank may be made unitary with the motor 90 and the top plate 10 may be cut away or recessed to receive it. 94 is a gear reduction box or housing which also may extend below the level of the top plate 10, which may be recessed or cut away to receive it. 95 are any suitable spacing lugs of the motor structure to which the box 94 may be secured. 96 is a removable end closure for the box 94. 97 indicates the motor shaft which extends through an aperture 98 in the side wall of the member 94. The lugs 95 may be connected with any suitable web 99 to protect the shaft. The shaft carries a drive pinion 100. The pinion 100 drives the large gear 101 on a shaft 102, which shaft is supported in a yoke or frame 103 pivoted as at 104. The gear 105, in mesh with the gear 106, on the shaft 107, is keyed in relation to the gear 101, to constitute a cluster gear. In mesh with the gear 106 is the idler 108 on the stub shaft or pin 109 herein shown as mounted on the side plate 96.

Figure 6:
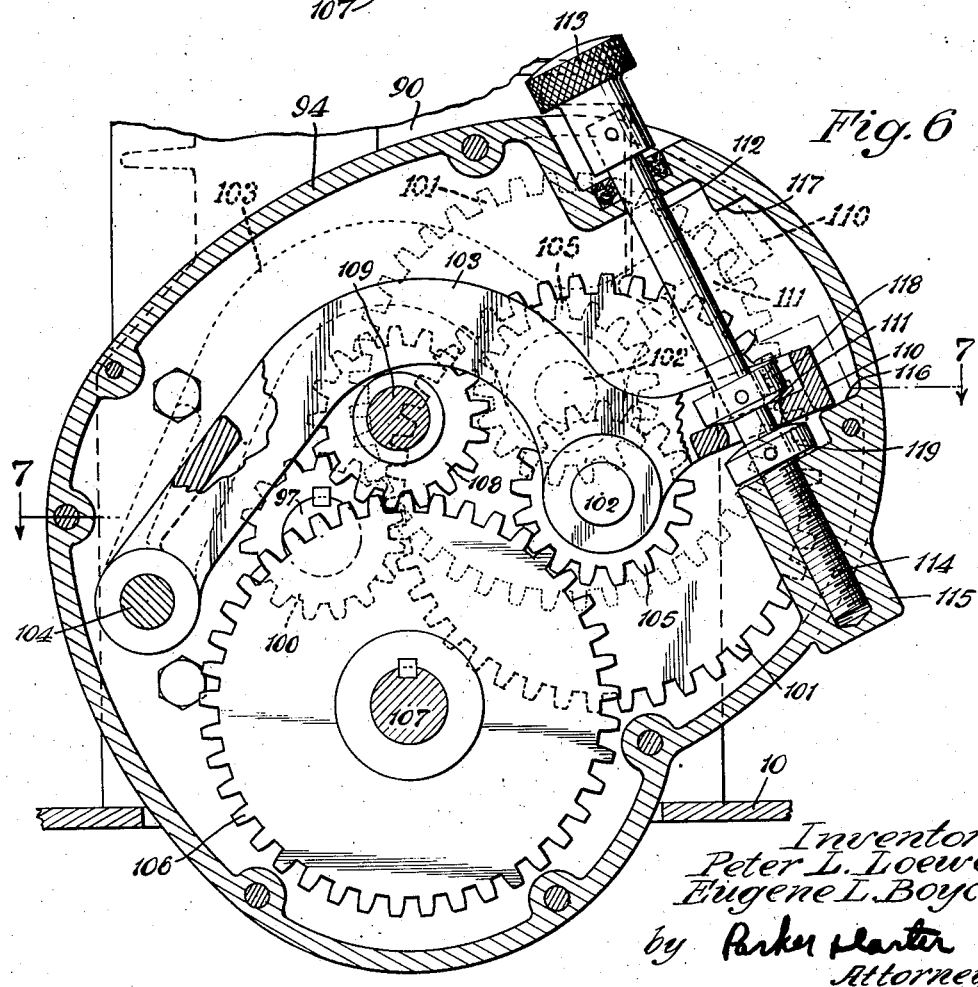
Figure 6 is a section on the line 6—6 of Figure 2 on an enlarged scale.

When a reversal of the direction of drive is desired, it may be obtained by shifting the yoke 103. The yoke 103 is shown in Figure 6 as having an extension 110 apertured as at 111 to receive an adjusting pin 112, having an external manually operable knurled head 113 and an inner portion 114 in screw threaded relationship with the boss 115 of the member 94. 116 is a limit stop formed in the wall 94 and 117 an opposite limit stop. The member 112 carries actuating collars 118, 119 secured thereto. It will be understood that when the parts are in the full line position in which they are shown in Figure 6, the idler is out of the line of drive. If the user rotates the head 113 sufficiently to move the parts to the dotted line position with the end of the yoke 103 against the stop 117, the pinion 105 is first disengaged from the gear 106 and is later engaged with the idler 108, which is thereby added to the line of drive. The result is a reversal in the direction of rotation of the driven shaft 107.

120 is any suitable actuating yoke which may be operated by any suitable control rod 121. The shaft 107 carries two sprockets 122, 123 at opposite sides of the bearing 124 which supports the outer end of the shaft 107 within any suitable housing 125. The sprocket 122 through the chain 126 drives the cutter sprocket 66 and thus rotates the cutter. The chain is maintained under tension by the idler 127 on the arm 128 pivoted as at 129 and urged by the coil spring 130 against one bight of the chain 126. Thus regardless of variations in adjustment of the cutter assembly along the slots 3, the chain 126 is maintained under proper driving tension. The sprocket 123 through the chain 135 drives the wheel sprocket 43. Thus the rotary cutter and the wheels are simultaneously but separately driven by rotation of the shaft 107.

I may employ any suitable handle means but I illustrate for example a handle including a fork 140, each side of which is provided with a rearward adjusting extension 141 slotted as at 142 and provided with a thumb nut 143 which extends through the ear 88 on the plate 80. Thus the angle of the handle may be controlled. The forward ends of each fork of the handle are pivoted to the side plate I as at 150. The control rod 121 may extend to the upper end of the handle and may be mounted in any suitable manner not herein shown and may be provided with any suitable manually operable control member not herein shown. Also any suitable means for controlling the motor may be employed but is not herein shown, the details of which do not of themselves form part of the present invention.

The use and operation of our invention are as follows:

We provide a compact and efficient lawn mower structure which has a low vertical clearance. By recessing or aperturing the top cutting plate 10, we are able to drop the motor 90 somewhat lower and to have such parts as the oil pan 93 and the lower part of the gear box 94 extend to a level below that of the upper edges of the side plates I. This provides a low clearance while still leaving the driving mechanism freely accessible.

We find it highly advantageous to provide a basic chassis of maximum strength and relative rigidity. This chassis includes side members such as the plates I herein shown, the cutting top plate 10, the wheel strut 14 and the rear roller tube 45. Thus when the device is assembled, a strong chassis is provided which is supported in predetermined relation to the surface over which the lawn mower moves by the tires 44 and the rear roller or rollers 48.

The cutter assembly is bodily removable from the chassis, a matter of great convenience in repair. For example dealers may carry duplicate cutter assemblies which may be sold and readily inserted, when the cutter assembly supplied with the lawn mower is worn out or broken. Service and repairmen may carry cutter assemblies for temporary loan so that the lawn mower as a whole need not be out of use during sharpening or repair.

When the user rotates the knobs 82 in order to adjust the cutter assembly toward and away from the supporting surface, no change of relationship results between the cutter bars 75 and the rotary cutter itself. The rotation of the knobs 82 and the consequent raising and lowering of the cutter assembly, does not change the relative angle between the cutting surface and the ground. When it is desired to change the relationship between bar and rotary cutter, it can be done by actuating the adjusting screw 67 which may be locked in any adjusted position by its associated lock nut. The spring 74 is effective to urge the cutter bar 75 as far toward the path of the cutting edges as the adjusting screw 68 will permit. This somewhat delicate adjustment is not affected by the adjustment of the cutter assembly as a whole along the slots 3. Also the spring thrust serves as a spring release when such a release becomes necessary. The idler 127 keeps the cutter driving chain 126 under proper tension at all adjustments. The fact that one of the bearing assemblies 62 is free to move in relation to one of the end members 60 prevents any locking or binding in the event of any slight misalignment or non-parallelism of the side plates I.

All of the bearings employed both for the cutter assembly and for the wheels are sealed units which call for no oiling. The wheels do not need to be oiled. The wheel interiors are protected by the removable hub plates 20a. The ratchet structure does not call for lubrication.

When the user wishes to sharpen the blades, he may do so by reversing the cutter drive and moving the cutter blades in retrograde across the cutter bar 75, after having treated the cutter bar with any suitable abrasive. The reversal may be obtained by actuating the structure shown in detail in Figure 6. Rotation of the knob 113 may be employed to include the idler 108 in the line of drive and the result is the reversal in the direction of rotation of the cutter.

We claim:

1. For use with a lawn mower chassis, a unitarily removable cutter assembly including end members and connections therebetween, a rotary cutter mounted on said end members, a cutter bar mounted on said end members and means for bodily adjusting said cutter assembly in relation to the level of the ground while maintaining a predetermined angular relationship between the cutter bar and the ground including means for guiding said cutter assembly, during its adjustment, along a generally rectilinear path, inclined upwardly and backwardly, from the ground, from the direction of movement of the lawn mower.

2. For use with a lawn mower chassis having side plates, a unitarily removable cutter assembly including a removable top plate, a support adjacent each side plate, a cutter shaft extending between said supports, cutter blades on said shaft, each support having a bearing for one end of said shaft, a cutter bar mounted on and extending between said supports, each said support having a guiding portion adapted to cooperate with the adjacent side plate of the chassis, and an adjusting and supporting connection between each said support and the chassis, including an adjusting member extending downwardly through said removable top plate and having an exterior and readily accessible manual operating portion.

3. For use with a lawn mower chassis having side plates, a unitarily removable cutter assembly including a removable top plate, a support adjacent each side plate, a cutter shaft extending between said supports, cutter blades on said shaft, each support having a bearing for one end of said shaft, a cutter bar mounter on and extending between said supports, each said support having a guiding portion adapted to cooperate with the adjacent side plate of the chassis, and an adjusting and supporting connection between each said support and the chassis, including an adjusting member extending downwardly through said removable top plate and having an exterior and readily accessible manual operating portion, said cutter bar being adjustably mounted on said supports for movement toward and away from the path of said cutter blades.

4. For use with a lawn mower chassis having side plates, a unitarily removable cutter assembly including a removable top plate, a support adjacent each side plate, a cutter shaft extending between said supports, cutter blades on said shaft, each support having a bearing for one end of said shaft, a cutter bar mounted on and extending between said supports, each said support having a guiding portion adapted to cooperate with the adjacent side plate of the chassis, an adjusting and supporting connection between each said support and the chassis, including an adjusting member extending downwardly through said removable top plate and having an exterior and readily accessible manual operation portion, said cutter bar being rotatably mounted on said supports, an adjustable stop on each said support adapted to limit the movement of said cutter bar toward the path of the cutter blades, and yielding means for normally urging said cutter bar against said stops.

5. For use with a lawn mower chassis having slotted side plates, a unitarily removable cutter assembly including a removable top plate, a support mounted for movement along the slot of each said plate, a cutter shaft extending between said support, cutter blades on said shaft, each support having a bearing for one end of said shaft, a cutter bar mounted on and extending between said supports, and an adjusting and supporting connection between each said support and the chassis, including an adjusting member extending downwardly through the removable top plate, and having an exterior and readily accessible manual operating portion.

6. In a lawn mower, a pair of spaced side plates, a top plate permanently connecting the upper edges of said side plates, an axle receiving tube extending between said side plates and constituting an additional support therebetween, the side plates each having an upwardly open slot extending downwardly from its upper edge, a cutting reel assembly including an end portion slidable in each said slots, each said side plate having an exterior shield masking said slot, and means for adjusting said end portions along said slots, and for thereby bodily raising and lowering said cutting reel assembly.

7. In a lawn mower, a pair of spaced side plates, a top plate permanently connecting the upper edges of said side plates, an axle receiving tube extending between said side plates and constituting an additional support therebetween, the side plates each having an upwardly open slot extending downwardly from its upper edge, a cutting reel assembly including an end portion slidable in each said slots, each said side plate having an exterior shield masking said slot, means for adjusting said end portions along said slots, and for thereby bodily raising and lowering said cutting reel assembly, and an additional top plate removably secured to the upper edges of said side plates, and overlying and masking the upper ends of said slots.

8. In a lawn mower, a pair of spaced side plates, a top plate permanently connecting the upper edges of said side plates, an axle receiving tube extending between said side plates and constituting an additional support therebetween, the side plates each having a slot extending downwardly from its upper edge, a cutting reel assembly including end portions slidable in said slots, each said side plate having an exterior shield masking said slot, means for adjusting said end portions along said slots, and for thereby bodily raising and lowering said cutting reel assembly, an additional top plate removably secured to the upper edges of said side plates, and overlying and masking the upper ends of said slots, the adjusting and supporting means for the cutting reel assembly, extending downwardly through said removable top plate.

9. For use with a lawn mower chassis having side plates, a unitarily removable cutter assembly including a support guided for movement along each said side plate, a cutter shaft extending between said supports, cutter blades on said shaft, each said support having a closed ended bearing socket adapted to receive one end of said cutter shaft, a cutter bar mounted on and extending between said supports, and a combined adjusting and supporting connection between said support and the chassis.

10. For use with a lawn mower chassis having side plates, a unitarily removable cutter assembly including a top plate removably secured to the upper edges of said side plates, a support guided for movement along each said side plate, a cutter shaft extending between said supports, cutter blades on said shaft, a bearing connection between each end of said shaft and one of said supports, a cutter bar mounted on and extending between said supports, and an adjusting and supporting connection between said support and the top plate, whereby the cutter assembly may be unitarily raised and lowered in relation to the chassis.

11. For use with a lawn mower chassis having side plates, a unitarily removable cutter assembly including a top plate removably secured to the upper edges of said side plates, a support guided for movement along each said side plate, a cutter shaft extending between said supports, cutter blades on said shaft, a bearing connection between each end of said shaft and one of said supports, a cutter bar mounted on and extending between said supports, and an adjusting and supporting connection between said support and the top plate whereby the cutter assembly may be unitarily raised and lowered in relation to the chassis, said supporting connections including a readily accessible manually operable portion positioned above said top plate.

12. For use with a lawn mower chassis having a pair of spaced, connected, side members, a unitarily removable cutter assembly including a support guided for movement along each said side member, a cutter shaft extending between said supports, cutter blades on said shaft, a bearing connection between each end of said shaft and one of said supports, and an adjusting and supporting connection between said support and the chassis, whereby the cutter assembly may be unitarly raised and lowered, including a combined adjusting and supporting member extending downwardly into cooperating relationship with each said support, and having an exterior, accessible, manually operable upper end portion.

13. In a lawn mower, a chassis including a pair of spaced side plates, a top plate connecting the upper edges of the side plate, an axle receiving tube extending between the side plates and constituting an additional support therebetween, the side plates each having an open ended slot extending from one edge thereof, a cutting reel assembly including an end portion slidable in each said slot, and means for adjusting said side portions along said slots and for thereby bodily raising and lowering said cutting reel assembly, including a combined adjusting and supporting connection in cooperative relation with said chassis and having a readily accessible manually operable portion.

14. For use with a lawn mower chassis having side plates, a unitarily removable cutter assembly including a support guided for movement along each side plate, a cutter shaft extending between said supports, cutter blades on said shaft, each said support having a bearing socket adapted to receive one end of said cutter shaft, a cutter bar mounted on and extending between said supports, and a combined adjusting and supporting connection between said support and chassis.

PETER L. LOEWE.
EUGENE L. BOYCE.